(No Model.)
T. FRICKER.
HOSE COUPLING.
No. 455,249.                               Patented June 30, 1891.
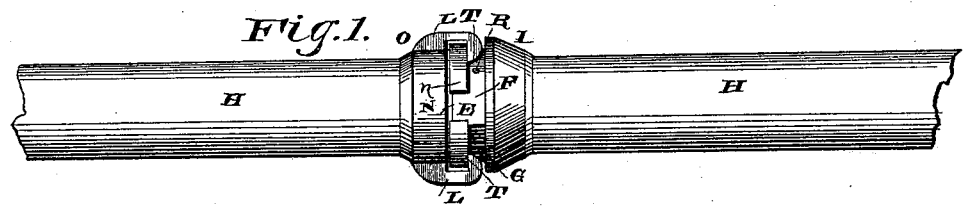
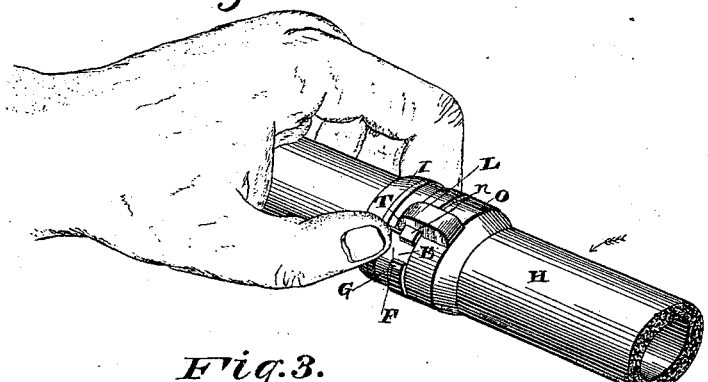
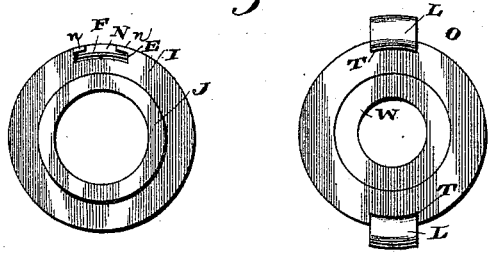
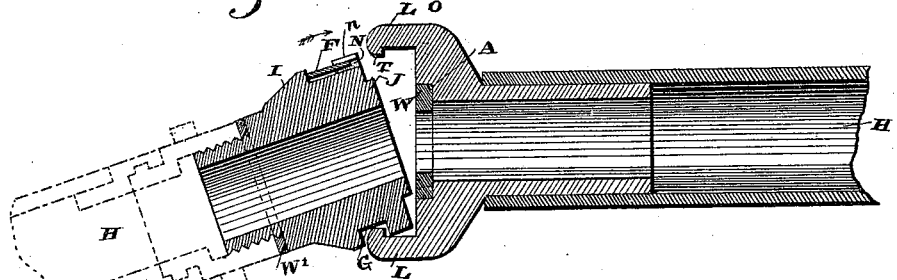
Witnesses                                                    Inventor
                                                         Thomas Fricker
By his Attorneys,

UNITED STATES PATENT OFFICE.

THOMAS FRICKER, OF ASHTABULA, OHIO.

HOSE-COUPLING.

SPECIFICATION forming part of Letters Patent No. 455,249, dated June 30, 1891.

Application filed October 7, 1890. Serial No. 367,335. (No model.)

*To all whom it may concern:*

Be it known that I, THOMAS FRICKER, a citizen of the United States, residing at Ashtabula, in the county of Ashtabula and State of Ohio, have invented a new and useful Hose-Coupling, of which the following is a specification.

This invention relates to hose-couplings, and the object of the same is to produce an improved coupling of this character which shall be very cheap in construction and simple in operation.

To this end the invention consists of a hose-coupling embodying the details of construction hereinafter more fully described and claimed, and as illustrated in the drawings, in which—

Figure 1 is a plan view of the ends of two sections of hose connected by my improved coupling. Fig. 2 is perspective view showing the manner in which the device is uncoupled by pressure of the thumb upon the spring. Fig. 3 is an end view of the two members of my coupling. Fig. 4 is a longitudinal section showing the members in the act of being coupled.

Referring to the said drawings, the letters I and O indicate, respectively, the inner and outer members of this improved hose-coupling, each of which is connected in any suitable manner to or within the end of a section of flexible hose H—such, for instance, as the hose used at the junctions of air-brake pipes beneath a train or the ordinary garden or fire hose. The inner member I is provided with an exterior groove G, communicating through a notch N with the outer end of the member and secured by a rivet R, (or other suitable means.) Within this groove is a flat spring F, having a forward extension E at its free end, which stands within the notch N and beneath small inwardly-projecting ears *n* at the upper corners of the notch, as best seen in Fig. 3. Upon the end of this member, around the central opening therethrough, is a raised ridge J, as shown. The outer member O is of approximately the same diameter as the inner member, and at diametrically-opposite points it is provided with forwardly-projecting lugs L, having inwardly-turned tips T, the latter being slightly rounded on their inner faces, as shown in Fig. 3. Around the central opening in this member is formed an annular groove A, within which is seated a rubber washer W, as shown.

The two members of my improved hose-coupling are connected in the manner shown in Fig. 4—that is to say, the tip T of one of the lugs is inserted in the groove G opposite its notch N, after which the other tip is borne forwardly by raising the outer member O, and the tip is thereby passed into the notch and depresses the spring. The members are then turned axially for about a quarter-revolution, when they will be coupled, as seen in Fig. 1, and when the ridge J will slightly embed the rubber washer W and prevent all leakage of the coupling at this point, an inward movement of the washer being resisted by its striking the shoulder A.

The two members of my improved hose-coupling are uncoupled in the manner shown in Fig. 2—that is to say, the operator depresses the free end of the spring F with his thumb or finger, meanwhile turning the outer member axially in the direction of the arrow, so as to bring the tip T of one of the lugs L over the end of the spring when depressed. The thumb is then removed and the outer member further turned until the said tip stands opposite the notch, when the tip is drawn therethrough and the outer member borne bodily downward to disconnect the other or lower tip from the groove G at its point of engagement therewith diametrically opposite the notch.

At the left of Fig. 4 I have shown the body of the inner member I as reduced and threaded and a washer W' as loosely mounted on the threaded portion. I have also shown in dotted lines at this point one member of an ordinary hose-coupling having interior threads engaging the threaded inner end of the member I, and a piece of hose connected to this ordinary coupling. From this it will be seen that I propose sometimes to construct the members of my improved coupling in this manner, in order that one or both of them may be screwed into the members of an ordinary hose-coupling. I have not deemed it necessary to illustrate the other member provided with an interior thread adapting it to be screwed upon the exterior of an ordinary coupling, because this expedient will naturally suggest itself from the single illustration above.

What is claimed as new is—

1. In a hose-coupling, the combination, with the outer member O, having an annular groove A around its central opening, a rubber washer W, seated in said groove, diametrically-opposite lugs L, located upon the sides and projecting beyond the face of said member, and inwardly-extending tips T at the free ends of said lugs, of the inner member I, provided with an exterior groove G, communicating through a notch N with the face of said member, inwardly-projecting ears $n$ at the upper corners of said notch, a flat spring F, secured by a rivet R within said groove and having a forward extension E standing within said notch below said ears, and a projecting ridge J, surrounding the central opening of said member, substantially as described.

2. In a hose-coupling, the combination, with the outer member O, diametrically-opposite lugs L, located upon the sides and projecting beyond the face of said member, and inwardly-extending tips T at the free ends of said lugs, of the inner member I, provided with an exterior groove G, communicating through a notch N with the face of said member, inwardly-projecting ears $n$ at the upper corners of said notch, and a flat spring F, secured by a rivet R within said groove and having a forward extension E standing within said notch below said ears, substantially as described.

3. In a hose-coupling, the combination, with the outer member O, lugs L, projecting beyond the face thereof, and inwardly-extending tips T on said lugs, of the inner member I, provided with a groove G, communicating through a notch N with the face of said member, and a spring F, connected to said member with its free end standing opposite said notch, substantially as described.

In testimony that I claim the foregoing as my own I have hereto affixed my signature in presence of two witnesses.

THOMAS FRICKER.

Witnesses:
   D. W. HASKILL,
   FRED A. WILLIAMS.